United States Patent
Yamada

(10) Patent No.: US 10,991,480 B2
(45) Date of Patent: Apr. 27, 2021

(54) WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Kensuke Yamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/765,941

(22) PCT Filed: Nov. 20, 2018

(86) PCT No.: PCT/JP2018/042756
§ 371 (c)(1),
(2) Date: May 21, 2020

(87) PCT Pub. No.: WO2019/102978
PCT Pub. Date: May 31, 2019

(65) Prior Publication Data
US 2020/0357537 A1    Nov. 12, 2020

(30) Foreign Application Priority Data
Nov. 23, 2017  (JP) .............................. JP2017-225287

(51) Int. Cl.
*H01B 7/02*  (2006.01)
*H01B 7/00*  (2006.01)
(Continued)

(52) U.S. Cl.
CPC ....... *H01B 7/0045* (2013.01); *B60R 16/0215* (2013.01); *H01B 5/02* (2013.01);
(Continued)

(58) Field of Classification Search
CPC ... H01B 5/02; H01B 5/04; H01B 5/12; H01B 7/0045; H01B 7/205; H01B 7/2813; B60R 16/0215
(Continued)

(56) References Cited

U.S. PATENT DOCUMENTS

| 6,864,426 B2 * | 3/2005 | Miyazaki | ............... H01R 9/032 174/750 |
| 2004/0099427 A1 * | 5/2004 | Kihira | ..................... B60L 50/51 174/359 |

(Continued)

FOREIGN PATENT DOCUMENTS

| EP | 2533253 A * | 2/2011 | ............... H01B 7/17 |
| JP | 2015-149175 A | 8/2015 | |

(Continued)

OTHER PUBLICATIONS

International Search Report dated Jan. 15, 2019 for WO 2019/102978 A1 (4 pages).

*Primary Examiner* — William H. Mayo, III
(74) *Attorney, Agent, or Firm* — Abelman, Frayne & Schwab

(57) ABSTRACT

An aluminum wire includes a strand main body, an inner layer, and an outer layer. The strand main body includes aluminum wire or an aluminum alloy wire. The inner layer includes Zn, a Zn alloy, Ni, or an Ni alloy and covers the outer circumferential surface of the strand main body. The outer layer includes Sn or an Sn alloy and covers the outer circumferential surface of the inner layer. In the aluminum (Continued)

wire, the pinhole ratio in the outer layer is no more than 4% and/or the thickness of the inner layer is at least 0.3 μm.

7 Claims, 4 Drawing Sheets

(51) Int. Cl.
    *B60R 16/02*     (2006.01)
    *H01B 5/02*     (2006.01)
    *H01B 5/10*     (2006.01)
    *H01B 5/12*     (2006.01)
    *H01B 7/20*     (2006.01)
    *H01B 7/28*     (2006.01)

(52) U.S. Cl.
    CPC ............... *H01B 5/104* (2013.01); *H01B 5/12* (2013.01); *H01B 7/205* (2013.01); *H01B 7/2813* (2013.01)

(58) Field of Classification Search
    USPC ............. 174/110 R, 110 SR, 120 R, 120 SR, 174/121 R, 121 SR
    See application file for complete search history.

(56) References Cited

U.S. PATENT DOCUMENTS

| | | | |
|---|---|---|---|
| 2006/0137893 A1* | 6/2006 | Sumi | H01R 24/562 |
| | | | 174/84 R |
| 2013/0118800 A1* | 5/2013 | Toyama | B60R 16/0215 |
| | | | 174/72 A |
| 2016/0155533 A1 | 6/2016 | Omoto | |

FOREIGN PATENT DOCUMENTS

| | | | | |
|---|---|---|---|---|
| JP | 2015-196881 A | | 11/2015 | |
| JP | 2016-100048 A | * | 5/2016 | ............... H01B 7/17 |
| JP | 2016-219104 A | | 12/2016 | |

* cited by examiner

WIRE HARNESS

CROSS REFERENCE TO RELATED APPLICATIONS

This application is a national phase of PCT application No. PCT/JP2018/042756, filed on 20 Nov. 2018, which claims priority from Japanese patent application No. 2017-225287, filed on 23 Nov. 2017, all of which are incorporated herein by reference.

TECHNICAL FIELD

The present disclosure relates to an aluminum-based strand, a twisted wire conductor, a braided wire, and a wire harness.

BACKGROUND

Conventionally, electrical wires in which outer circumferential surfaces of copper-based twisted wire conductors obtained by twisting together a plurality of copper-based strands are covered by insulators have been used in wire harnesses used in vehicles such as automobiles. Also, in order to cover electrical wires exposed at a harness end portion of a wire harness, copper-based braided wires obtained by braiding a plurality of copper-based strands have been used. Specifically, bare soft copper wires, oxygen-free soft copper wires, tin-plated soft copper wires, and the like have been used as the above-described copper-based strands (see Patent Document 1).

In recent years, in order to reduce the weight of wire harnesses and the like, studies have been conducted regarding the use of aluminum-based strands made of aluminum or an aluminum alloy, instead of copper-based strands.

PRIOR ART DOCUMENT

Patent Document

Patent Document 1: JP 2015-018756A

SUMMARY OF THE INVENTION

Problems to be Solved

However, aluminum has a larger frictional coefficient than copper. Thus, an aluminum-based strand has poorer abrasion resistance than a copper-based strand. Therefore, in order to protect a strand main body, the surface of a strand is covered with a tin plating layer or the like. However, if this type of protection method is used, corrosion is likely to occur between dissimilar metals, namely, aluminum and tin. In particular, if a twisted wire conductor or a braided wire in which aluminum-based strands provided with a tin plating layer is used is configured to be used outside the interior space of a vehicle, such as under the floor of a vehicle, the twisted wire conductor or the braided wire is likely to be exposed to salt water, and the twisted wire conductor or the braided wire is likely to corrode. In particular, a braided wire is likely to be affected by salt water because the braided wire is likely to undergo abrasion due to strands rubbing against each other at braided portions, and because the braided wire covers an outer surface of a wire harness.

The present disclosure was made in light of the above-described circumstances, and aims to provide an aluminum-based strand capable of suppressing corrosion caused by salt water, and a twisted wire conductor, a braided wire, and a wire harness in which the aluminum-based strand is used.

Means to Solve the Problem

An aspect of the present disclosure is an aluminum-based strand that includes a strand main body portion constituted by an aluminum wire or an aluminum alloy wire, an inner layer constituted by Zn or a Zn alloy, or Ni or a Ni alloy and covering an outer circumferential surface of the strand main body portion, and an outer layer constituted by Sn or a Sn alloy and covering an outer circumferential surface of the inner layer, in which the outer layer has a pinhole ratio of 4% or less, and/or the inner layer has a thickness of 0.3 µm or more.

Another aspect of the present disclosure is a twisted wire conductor that includes a plurality of strands that are twisted together, in which each of the strands is the aluminum-based strand.

Another aspect of the present disclosure is a tubular braided wire that includes a plurality of strands that are braided, in which each of the strands is the aluminum-based strand.

Still another aspect of the present disclosure is a wire harness that includes an electrical wire provided with the twisted wire conductor.

Yet another aspect of the present disclosure is a wire harness that includes the braided wire.

Effect of the Invention

The aluminum-based strand has an inner layer and an outer layer that are constituted by the above-described specific material, and a pinhole ratio of the outer layer is in a specific range, and/or the thickness of the inner layer is in a specific range. Thus, when the pinhole ratio of the outer layer of the aluminum-based strand is limited to a specific range, corrosion is unlikely to occur through dissimilar metal contact between Sn (galvanic corrosion potential: −0.138) and Al (galvanic corrosion potential: 1.67) that have a large galvanic corrosion potential difference, due to salt water that has passed through pinholes in the outer layer and pinholes that may be included in the inner layer. That is, in this case, even if the inner layer has pinholes, corrosion of the strand main body portion constituted by an aluminum wire or an aluminum alloy wire can be suppressed by reducing the number of pinholes in the outer layer. On the other hand, when the thickness of the inner layer of the aluminum-based strand is set to a specific range, even if the outer layer has pinholes, as a result of increasing the thickness of the inner layer, corrosion is unlikely to occur through dissimilar metal contact between Sn and Al due to salt water that has entered through the pinholes in the outer layer. Thus, in this case as well, it is possible to suppress corrosion of the strand main body portion constituted by an aluminum wire or an aluminum alloy wire. Also, when the pinhole ratio of the outer layer of the aluminum-based strand is limited to a specific range and the thickness of the inner layer is limited to a specific range, corrosion of the strand main body portion constituted by the aluminum wire or the aluminum alloy wire can be easily suppressed due to the above-described effects.

The twisted wire conductor has a plurality of the aluminum-based strands that are twisted together. Also, the braided wire has a plurality of the aluminum-based strands that are braided. Thus, the twisted wire conductor and the braided wire can suppress corrosion caused by salt water. Also, because the braided wire has an outer layer constituted by Sn or a Sn alloy, abrasion resulting from strands rubbing against each other at braided portions can also be suppressed, and thus the braided wire has the advantage of suppressing disconnection of the strands caused by vibration.

The wire harness has an electrical wire provided with the twisted wire conductor, or has the braided wire. Thus, the wire harness can suppress corrosion of the twisted wire conductor or the braided wire caused by salt water. Therefore, the wire harness can be suitably used for use in the outside of the interior space of a vehicle, such as under the floor of an automobile.

DETAILED DESCRIPTION TO EXECUTE THE INVENTION

Figure 1:
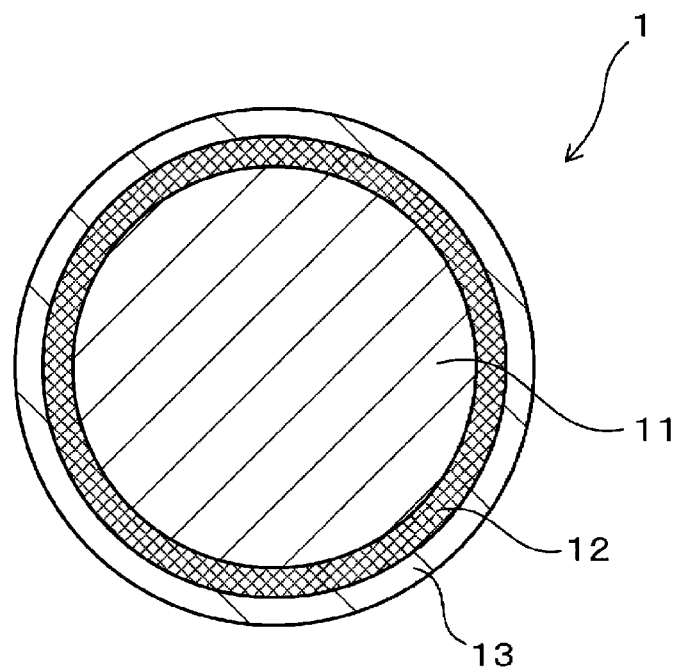
FIG. 1 is a diagram schematically showing a cross-section perpendicular to a strand axis of an aluminum-based strand of Example 1.

The aluminum-based strand includes a strand main body portion, an inner layer, and an outer layer.

The strand main body portion is constituted by an aluminum wire or an aluminum alloy wire. Examples of the aluminum alloy include 1000 series Al alloys, 3000 series Al alloys, 5000 series Al alloys, 6000 series Al alloys, and 7000 series Al alloys. Also, in addition, an example of the aluminum alloy is an aluminum alloy having a chemical composition containing Mg in an amount of 0.1 mass % to 1.5 mass % inclusive, Si in an amount of 0.03 mass % to 2.0 mass % inclusive, and Cu in an amount of 0.05 mass % to 0.5 mass % inclusive, the remaining portion including Al and inevitable impurities, and a mass ratio between Mg and Si (Mg/Si) being 0.8 to 3.5 inclusive. An aluminum alloy having the chemical composition may have a tensile strength of 200 MPa or more, and have an electrical conductivity of 50% IACS or more. If an aluminum alloy having the chemical composition is used as the aluminum alloy for constituting an aluminum alloy wire, the strength and conductivity of a strand can be increased. Thus, a twisted wire conductor whose twisted wire strength and conductivity are ensured, and a braided wire by which disconnection of strands caused by vibration can be suppressed while ensuring good shield performance can be realized. Note that the chemical composition may further contain at least one element of Fe in an amount of 0.1 mass % to 1.0 mass % inclusive and Cr in an amount of 0.01 mass % to 0.5 mass % inclusive. Also, the chemical composition may further contain at least one element of Ti (500 ppm or less) and B (50 ppm or less) in a mass fraction.

The inner layer covers an outer circumferential surface of the strand main body portion. The inner layer mainly has the function of increasing adherence of the outer layer to the strand main body portion. The inner layer is constituted by Zn or a Zn alloy, or Ni or a Ni alloy. The inner layer constituted by Zn or a Zn alloy can be formed by removing an oxide film formed on the surface of the strand main body portion and performing zincate treatment once, or two or more times (when zincate treatment is performed twice, the treatment is called double-zincate treatment), for example. Also, the inner layer constituted by Ni or a Ni alloy can be formed by removing an oxide film formed on the surface of the strand main body portion and performing Ni plating or Ni alloy plating once, or two or more times, for example. That is, the inner layer may be constituted by one, or two or more layers. From the viewpoint of easily improving adherence between the strand main body portion and the outer layer, the inner layer may be preferably constituted by Zn or a Zn alloy, and more preferably constituted by Zn.

The outer layer covers an outer circumferential surface of the inner layer. The outer layer mainly has the function of improving the abrasion resistance of the surface of a strand and suppressing abrasion of the strand main body portion. The outer layer is constituted by Sn or a Sn alloy. The outer layer may be formed by performing Sn plating or Sn alloy plating once, or two or more times on the surface of the inner layer, for example. From the viewpoint of abrasion resistance, good electrical connectivity with copper-based terminals, and economic efficiency, the outer layer may be constituted by Sn.

In the aluminum-based strand, the inner layer has a thickness of 0.3 µm or more. If the thickness of the inner layer is less than 0.3 µm, the thickness of the inner layer is not sufficient, and it is likely that corrosion will occur through dissimilar metal contact between Sn and Al due to salt water that has entered through pinholes in the outer layer. From the viewpoint of increasing the effect of suppressing corrosion caused by salt water, the thickness of the inner layer may be preferably 0.32 µm or more, more preferably 0.35 µm or more, even more preferably 0.37 µm or more, and still more preferably 0.4 µm or more. Note that, from the viewpoint of shortening the time taken for forming the inner layer, and improving the productivity of the inner layer by reducing the number of times inner layer formation processing such as zincate treatment or the like is performed, the thickness of the inner layer may be preferably 1 µm or less, more preferably 0.8 µm or less, even more preferably 0.6 µm or less, and still more preferably 0.5 µm or less.

In the aluminum-based strand, the outer layer has a thickness of 3.2 µm or more. According to this configuration, increasing the thickness of the outer layer is advantageous in that a later-described pinhole ratio of the outer layer can be easily set to 4% or less, and the suppression of corrosion of the strand main body portion can be achieved by reducing the number of pinholes in the outer layer. Also, this configuration has the advantage of improving abrasion resistance by increasing the thickness of the outer layer. The thickness of the outer layer may be preferably 3.5 µm or more, more preferably 3.7 µm or more, even more preferably 4 µm or more, and still more preferably 4.5 µm or more. Note that, from the viewpoint of improving the productivity of the outer layer by shortening the time taken for forming the outer layer, the thickness of the outer layer may be preferably 10 μm or less, more preferably 8 μm or less, even more preferably 7 μm or less, and still more preferably 6 μm or less.

In the aluminum-based strand, the pinhole ratio of the outer layer is set to 4% or less. If the pinhole ratio of the outer layer is over 4%, it is likely that salt water will enter the inner layer and the strand main body portion due to an increase in the number of pinholes in the outer layer, and corrosion may occur through dissimilar metal contact between Sn and Al. The pinhole ratio of the outer layer may be preferably 3.5% or less, more preferably 3.3% or less, even more preferably 3% or less, still more preferably 2.5% or less, and yet more preferably 2% or less. Note that it is conceivable that other processing may be required after the outer layer is formed, in order to substantially eliminate pinholes. Also, even if any pinholes are present, the effect of suppressing corrosion caused by salt water can be obtained as long as the pinhole ratio thereof is within the pinhole ratio range. Thus, there is no particular limitation on the lower limit of the pinhole ratio of the outer layer.

A value calculated as in a manner described below is used as the pinhole ratio of the outer layer. Specifically, a testing apparatus is prepared which is configured such that a sample, a reference electrode (Ag/AgCl electrode), and a counter electrode (Pt electrode) of the reference electrode are disposed in a 1-wt % NaCl aqueous solution (having a solution temperature of 35° C.), and are connected to a potentiostat to cause a redox reaction. Note that the sample is in the form of a strand. Then, the potential of the sample is swept by applying a voltage of 10 mV to the testing apparatus, and a response current (dissolution current) generated at this time is measured. When it is presumed that a sample in which the entire surface of an inner layer is completely covered by an ideal outer layer that has no pinholes has a coverage of 100%, the coverage (%) indicating how much covering is actually realized by the outer layer, the coverage of the sample is estimated from a numerical value obtained through measurement. Also, "100–the calculated outer layer coverage" is denoted as the pinhole ratio of the outer layer.

Note that, with the aluminum-based strand, numerical limitations on the thickness of the inner layer, the thickness of the outer layer, and the pinhole ratio of the outer layer that have been described above can be combined as necessary. In particular, when the pinhole ratio of the outer layer is 3% or less, and the inner layer has a thickness of 0.4 μm or more, it is possible to obtain an aluminum-based strand by which corrosion of a strand main body portion constituted by an aluminum wire or an aluminum alloy wire can be suppressed due to effects resulting from a decrease in the number of pinholes in the outer layer and an increase in the thickness of the inner layer.

The outer diameter of the strand main body portion in the aluminum-based strand may be set to 0.260 mm to 0.420 mm inclusive, and may be preferably set to 0.300 mm to 0.350 mm inclusive, if the aluminum-based strand is to be applied to a braided wire, for example. Also, the outer diameter of the strand main body portion in the aluminum-based strand may be set to 0.155 mm to 0.420 mm inclusive, and may be preferably set to 0.304 mm to 0.320 mm inclusive, if the aluminum-based strand is to be applied to a twisted wire conductor, for example.

Next, the twisted wire conductor has a plurality of strands that are twisted together. The twisted wire conductor may be obtained by twisting together only a plurality of strands, or by twisting together a plurality of strands around an outer circumferential surface of a tension member. Also, the aluminum-based strand is used as a strand in the twisted wire conductor. Because the aluminum-based strand having an outer layer constituted by Sn or a Sn alloy on a surface thereof is used in the twisted wire conductor, the twisted wire conductor has the advantage of easily suppressing corrosion even when subjected to salt water if the twisted wire conductor is connected to a copper-based terminal constituted by copper or a copper alloy.

Next, the braided wire is obtained by braiding a plurality of strands into a tubular shape. Also, the aluminum-based strand is used as a strand in the braided wire.

Next, a wire harness having an electrical wire provided with the twisted wire conductor will be described.

In the wire harness having an electrical wire provided with the twisted wire conductor, a specific configuration of the electrical wire is a configuration in which the electrical wire has the twisted wire conductor and an insulator covering an outer circumferential surface of the twisted wire conductor. A known material can be used as the material of the insulator. Note that the wire harness having an electrical wire provided with the twisted wire conductor may include one, two, or more electrical wires provided with the twisted wire conductor, or may include one, two, or more electrical wires provided with other twisted wire conductor, in addition to electrical wires provided with the twisted wire conductor. Also, in the wire harness having an electrical wire provided with the twisted wire conductor, various known protective members constituted by sheets, tape, tubes, pipes, or the like can be used as a protective member for covering an outer circumferential surface of the electrical wire.

Specific examples of a configuration of the wire harness having an electrical wire provided with the twisted wire conductor include a configuration in which the wire harness has an electrical wire provided with the twisted wire conductor, a protective member covering the outer circumferential surface of the electrical wire, and a connector connected to the electrical wire exposed from the protective member at a harness end portion, and a configuration in which, in addition to this configuration, the wire harness also has a braided wire that is fixed to an end portion of the protective member and an end portion of the connector, and covers the outer circumferential surface of the electrical wire exposed from the protective member. Note that the braided wire in this configuration may be obtained by braiding a plurality of the aluminum-based strands into a tubular shape, or may be obtained by braiding aluminum-based strands that are different from the aluminum-based strand or copper-based strands into a tubular shape. In the case of the former configuration, a wire harness having good corrosion resistance to salt water can be obtained.

Next, a wire harness having the braided wire will be described.

The wire harness having the braided wire may have a configuration in which at least a harness end portion is covered by the braided wire. An electrical wire of the wire harness is often exposed at a harness end portion. According to the above-described configuration, even if an electrical wire is exposed at a harness end portion, the exposed portion can be covered by the braided wire, and corrosion caused by salt water can be suppressed, and strands of the braided wire are unlikely to be disconnected due to strands rubbing against each other due to vibration. Thus, according to the above-described configuration, a wire harness having high shielding reliability due to the braided wire can be obtained.

A specific example of a configuration of the wire harness having the braided wire is a configuration in which the wire harness has an electrical wire, a protective member covering the outer circumferential surface of the electrical wire, a connector connected to the electrical wire exposed from the protective member at a harness end portion, and the braided wire that is fixed to an end portion of the protective member and an end portion of the connector, and covers the outer circumferential surface of the electrical wire exposed from the protective member. According to this configuration, if the connector of the wire harness is connected to a vibration portion, corrosion caused by salt water can be suppressed, and even if the braided wire repeatedly vibrates due to vibration of the vibration portion, strands of the braided wire are unlikely to be disconnected, and thus a wire harness having high shielding reliability due to the braided wire can be obtained. Note that examples of the vibration portion include an engine of a vehicle such as an automobile, a door opening and closing portion (a bending portion), a motor, and a battery.

In the wire harness having the braided wire, a specific configuration of the electrical wire is a configuration in which the electrical wire has a twisted wire conductor having a plurality of strands that are twisted together and an insulator covering an outer circumferential surface of the twisted wire conductor. A known material can be used as the material of the insulator. Note that strands of the twisted wire conductor in the above-described configuration may be the aluminum-based strands, or may be aluminum-based strands that are different from the aluminum-based strands, copper-based strands, or the like. In the case of the former configuration, a wire harness having good corrosion resistance to salt water can be obtained. Also, in the wire harness having the braided wire, various known protective members constituted by sheets, tape, tubes, pipes, or the like can be used as a protective member for covering an outer circumferential surface of the electrical wire.

The above-described wire harness may be configured to be used outside the interior space of a vehicle. Examples of the vehicle include automobiles, electric railcars, trains, and motorcycles. According to the above-described configuration, corrosion of the twisted wire conductor or the braided wire caused by salt water can be easily suppressed even when exposed to salt water in the outside of an interior space of a vehicle.

Note that the above-described configurations may be combined as needed in order to obtain the above-described effects and the like.

EXAMPLES

Hereinafter, aluminum-based strands, twisted wire conductors, braided wires, and wire harnesses of examples will be described with reference to the drawings.

Example 1

An aluminum-based strand of Example 1 will be described with reference to FIG. 1. As shown in FIG. 1, an aluminum-based strand 1 of this example includes a strand main body portion 11, an inner layer 12, and an outer layer 13. The strand main body portion 11 is constituted by an aluminum wire or an aluminum alloy wire. The inner layer 12 is constituted by Zn or a Zn alloy, or Ni or a Ni alloy, and covers an outer circumferential surface of the strand main body portion 11. The outer layer 13 is constituted by Sn or a Sn alloy, and covers an outer circumferential surface of the inner layer 12. In the aluminum-based strand 1, the pinhole ratio of the outer layer 13 is 4% or less, and/or the inner layer 12 has a thickness of 0.3 µm or more.

Example 2

Figure 2:
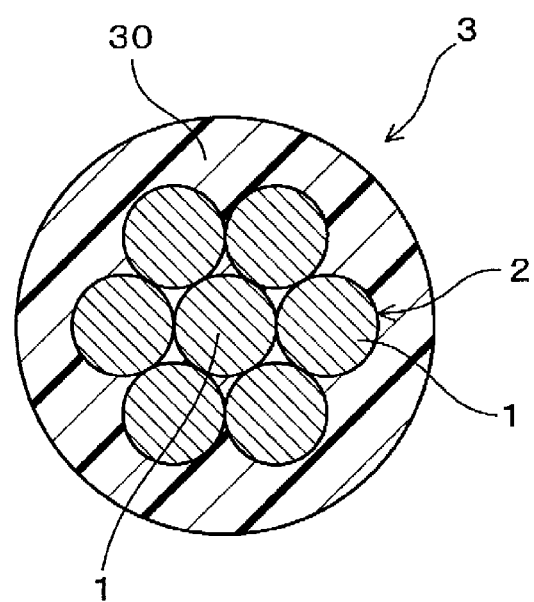
FIG. 2 is a schematic external view of a twisted wire conductor of Example 2 and an electrical wire in which the twisted wire conductor is used.

A twisted wire conductor of Example 2 will be described with reference to FIG. 2. As shown in FIG. 2, the twisted wire conductor 2 of this example has a plurality of the aluminum-based strands 1 (the strands of Example 1) that are twisted together. Note that, although not shown, the twisted wire conductor 2 may be subjected to circular compression. Also, an electrical wire 3 has an insulator 30 made of polyvinyl chloride or the like, on an outer circumferential surface of the twisted wire conductor 2.

Example 3

Figure 3:
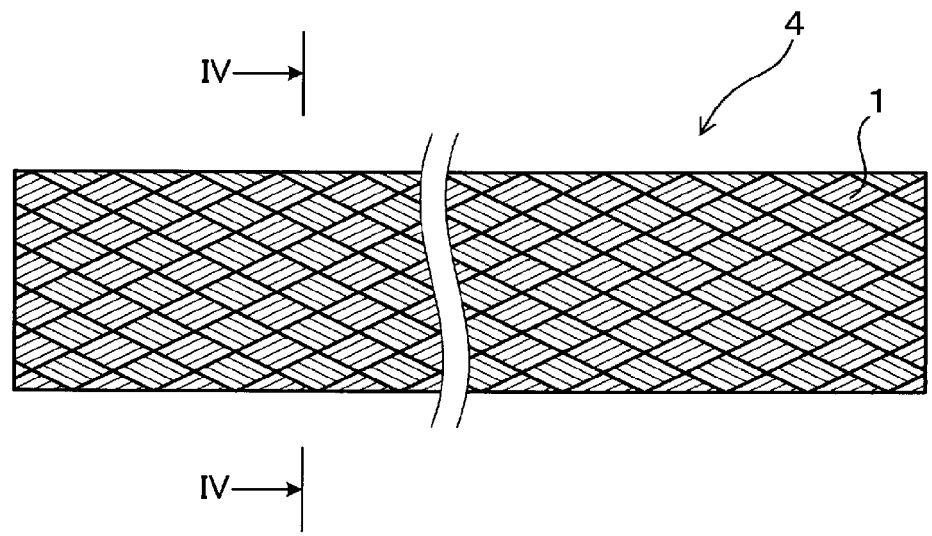
FIG. 3 is a schematic external view of a braided wire of Example 3.
Figure 4:
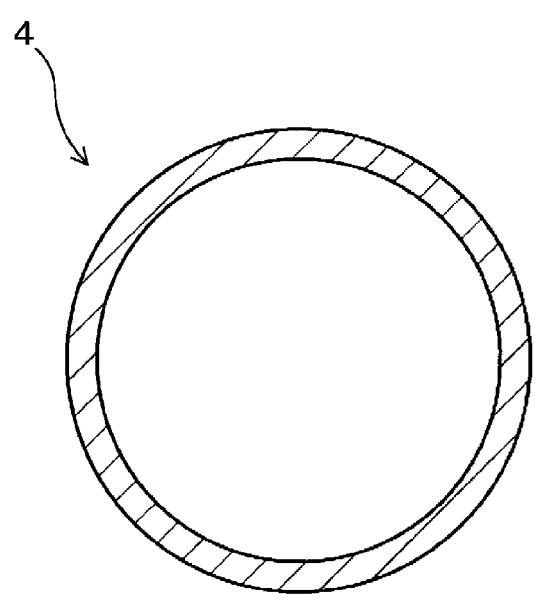
FIG. 4 is a diagram schematically showing a cross-section taken along line IV-IV in FIG. 3.

A braided wire of Example 3 will be described with reference to FIGS. 3 and 4. As shown in FIGS. 3 and 4, a braided wire 4 of this example has a plurality of the aluminum-based strands 1 (the strands of Example 1) that are braided. The braided wire 4 has a tubular shape. Note that the aluminum-based strands 1 are not shown in FIG. 4.

Example 4

Figure 5:
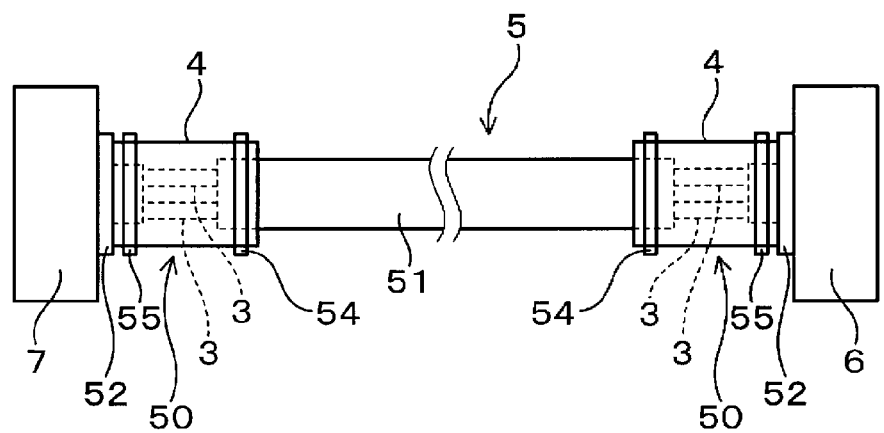
FIG. 5 is a diagram schematically showing a wire harness of Example 4 and an application example of the wire harness.

A wire harness of Example 4 will be described with reference to FIG. 5. As shown in FIG. 5, a wire harness 5 of this example includes the electrical wires 3 (the electrical wires of Example 2), a protective member 51 covering the outer circumferential surface of the electrical wires 3, connectors 52 connected to the electrical wires 3 exposed from the protective member 51 at harness end portions 50, and braided wires 4 (the braided wires of Example 3) that are respectively fixed to end portions of the protective member 51 and end portions of the connectors 52, and that cover the outer circumferential surfaces of the electrical wires 3 exposed from the protective member 51. An example in which both harness end portions 50 are covered by the braided wires 4 is shown in FIG. 5. Also, specifically, the protective member 51 is a metal pipe.

In this example, the connector 52 located on one harness end portion 50 side is connected to an engine of an automobile, which is a first vibration portion 6. Also, the connector 52 located on the other harness end portion 50 side is connected to a battery of the automobile, which is a second vibration portion 7. Note that the wire harness 5 of this example is a wire harness for underfloor use installed outside the interior space of an automobile. Also, the braided wire 4 is fixed to an end portion of the protective member 51 by crimping a ring member 54. Also, the braided wire 4 is fixed to an end portion of the connector 52 through fastening using a band member 55.

Hereinafter, samples of aluminum-based strands were produced and evaluated. Experimental examples therefor will be described.

Experimental Example (Relationship Between Pinhole Ratio of Outer Layer and Thickness of Outer Layer)

An Al alloy wire (having a diameter of 0.26 mm) that is made of an aluminum alloy and in which the outer shape of a strand is circular when viewed in a cross-section perpendicular to a strand axis was prepared. The aluminum alloy had a chemical composition containing Mg in an amount of 0.1 mass % to 1.5 mass % inclusive, Si in an amount of 0.03 mass % to 2.0 mass % inclusive, and Cu in an amount of 0.05 mass % to 0.5 mass % inclusive, the remaining portion including Al and inevitable impurities, and a mass ratio between Mg and Si (Mg/Si) being 0.8 to 3.5 inclusive.

Then, double-zincate treatment was performed on the outer circumferential surface of the Al alloy wire to form an inner layer constituted by a Zn layer having a thickness of 0.4 µm. Then, reflow Sn plating was performed on the outer circumferential surface of the inner layer to form a Sn layer having a predetermined thickness. In this example, the thickness of the Sn layer was set to 2 µm, 4 µm, or 6 µm by changing the plating time. Accordingly, three types of aluminum-based strands whose outer layers had different thicknesses were produced.

Figure 6:
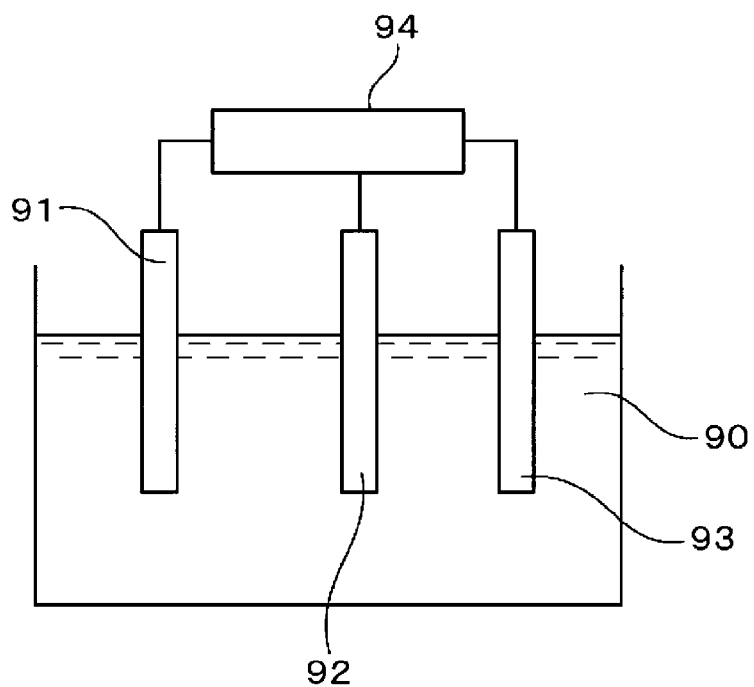
FIG. 6 is a diagram illustrating an overview of a testing apparatus used to measure a pinhole ratio of an outer layer in experimental examples.

Next, pinhole ratios of the outer layers of three types of aluminum-based strands were obtained using the above-described method and a testing apparatus shown in FIG. 6. In FIG. 6, reference numeral 90 indicates a 1 wt % NaCl aqueous solution (having a solution temperature of 35° C.). Reference numeral 91 indicates a sample. Reference numeral 92 indicates a reference electrode. Reference numeral 93 indicates a counter electrode of the reference electrode. Reference numeral 94 indicates a potentiostat.

Figure 7:
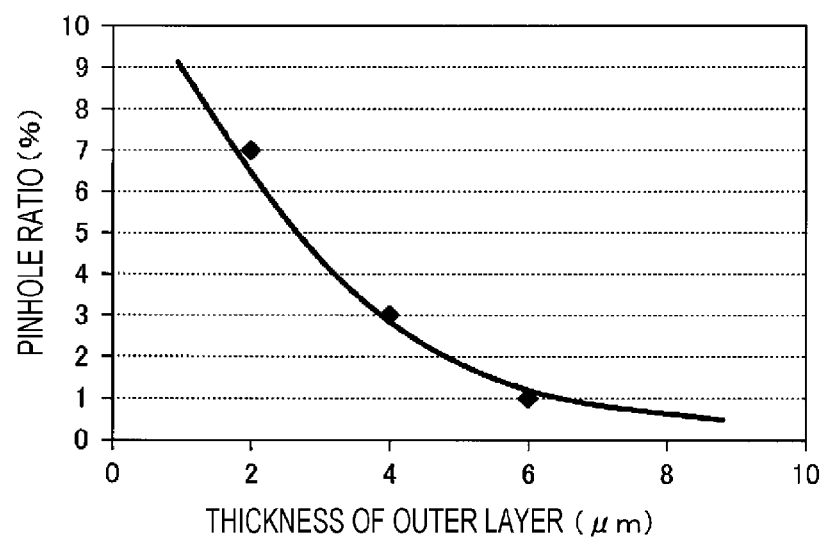
FIG. 7 is a graph showing a relationship between the thickness of an outer layer and the pinhole ratio of the outer layer that were measured in the experimental examples.

The relationship between the thickness of the outer layer and the pinhole ratio of the outer layer shown in FIG. 7 was obtained through the above-described experiment. According to FIG. 7, it can be understood that the pinhole ratio of the outer layer can be easily reduced to 4% or less by increasing the thickness of the outer layer to 3.2 µm or more. Also, it can be understood that the pinhole ratio of the outer layer can be easily reduced to 3.5% or less by increasing the thickness of the outer layer to 3.5 µm or more. Also, it can be understood that the pinhole ratio of the outer layer can be easily reduced to 3% or less by increasing the thickness of the outer layer to 4 µm or more.

Experimental Example 2

Aluminum-based braided wires of Samples 1 to 8 having configurations of inner layers and outer layers shown in Table 1 were produced in a manner that was substantially the same as for Experimental Example 1.

(Salt Spray Test)

Sample 1 was left at 120° C. for 1000 hours. Then, a 5 wt % NaCl aqueous solution (having a temperature of 35° C.) was sprayed onto Sample 1 for 96 hours. Then, Sample 1 was left for 96 hours under high-temperature and high-humidity conditions at 85° C. and 90% RH. A corrosion state of Sample 1 after the above-described salt spray test was performed was observed using a microscope. As a result, Sample 1 was corroded by salt water, and did not have a corrosion suppression effect. The corrosion state of Sample 1 was evaluated as "C". Then, similarly to the above, salt spray tests were performed on Samples 2 to 8. When corrosion of a sample caused by salt water was suppressed compared to Sample 1, and a pinhole ratio of the entire outer layer thereof was 1% or less, such a sample was evaluated as "A+". When corrosion of a sample caused by salt water was suppressed compared to Sample 1, and a pinhole ratio of the entire outer layer thereof exceeded 1% and 3% or less, such a sample was evaluated as "A". When corrosion of a sample caused by salt water was suppressed compared to Sample 1, and a pinhole ratio of the entire outer layer thereof exceeded 3% and 5% or less, such a sample was evaluated as "B+". When corrosion of a sample caused by salt water was suppressed compared to Sample 1, and a pinhole ratio of the entire outer layer thereof exceeded 5% and 10% or less, such a sample was evaluated as "B". Note that "B" indicates that, although corrosion occurred due to salt water in an allowable range, a corrosion suppression effect was somewhat obtained. The above-described results are collectively shown in Table 1.

TABLE 1

| | | Sample 1 | Sample 2 | Sample 3 | Sample 4 | Sample 5 | Sample 6 | Sample 7 | Sample 8 |
|---|---|---|---|---|---|---|---|---|---|
| Aluminum- | Outer layer | | | | | | | | |
| based strand | Thickness (µm) | 2 | 2 | 2 | 3.2 | 3.5 | 4 | 4 | 6 |
| | Pinhole ratio (%) | 11 | 7 | 7 | 4 | 3.5 | 3 | 3 | 1 |
| | Inner layer | | | | | | | | |
| | Thickness (µm) | 0.2 | 0.3 | 0.4 | 0.3 | 0.4 | 0.2 | 0.4 | 0.4 |
| | Forming condition | Single zincate | Double zincate | Double zincate | Double zincate | Double zincate | Single zincate | Double zincate | Double zincate |
| | Evaluation | | | | | | | | |
| | Salt spray test | C | B | B | B+ | B+ | A | A | A+ |

According to Table 1, it can be understood that, if the pinhole ratio of the outer layer of the aluminum-based strand is limited to a specific range, corrosion is unlikely to occur through dissimilar metal contact between Sn and Al due to salt water that has passed through pinholes in the outer layer and pinholes that may be included in the inner layer. That is, it can be understood that, in this case, even if the inner layer has pinholes, corrosion of the strand main body portion constituted by an aluminum wire or an aluminum alloy wire can be suppressed by reducing the number of pinholes in the outer layer. Also, it can be understood that, if the thickness of the inner layer of the aluminum-based strand is set to a specific range, even if the outer layer has pinholes, by increasing the thickness of the inner layer, corrosion is unlikely to occur through dissimilar metal contact between Sn and Al due to salt water that has entered through the pinholes in the outer layer. Thus, it can be understood that, in this case as well, it is possible to suppress corrosion of the strand main body portion constituted by an aluminum wire or an aluminum alloy wire. Also, it can be understood that, when the pinhole ratio of the outer layer of the aluminum-based strand is limited to a specific range and the thickness of the inner layer is limited to a specific range, corrosion of the strand main body portion constituted by the aluminum wire or the aluminum alloy wire can be easily suppressed due to the above-described effects.

Although examples of the present disclosure have been described in detail above, the present disclosure is not limited to the above-described examples and experimental examples, and various modifications can be made without departing from the gist of the present invention.

What is claimed is:

1. A wire harness comprising:
   an electrical wire;
   a protective member covering an outer circumferential surface of the electrical wire;
   a connector connected to the electrical wire exposed from the protective member at a harness end portion; and
   a tubular braided wire that is fixed to an end portion of the protective member and an end portion of the connector, and that covers the outer circumferential surface of the electrical wire exposed from the protective member,
   wherein the braided wire includes a plurality of strands that are braided,
   the strands are each constituted by an aluminum-based strand that includes:
      a strand main body portion constituted by an aluminum wire or an aluminum alloy wire;
      an inner layer constituted by Zn or a Zn alloy, or Ni or a Ni alloy and covering an outer circumferential surface of the strand main body portion; and
      an outer layer constituted by Sn or a Sn alloy and covering an outer circumferential surface of the inner layer,
   wherein the outer layer has a pinhole ratio of 4% or less, and
   the inner layer has a thickness of 0.3 μm or more.

2. The wire harness according to claim 1, wherein the outer layer has a pinhole ratio of 3% or less, and the inner layer has a thickness of 0.4 μm or more.

3. The wire harness according to claim 1, wherein the outer layer has a thickness of 3.2 μm or more.

4. The wire harness according to claim 1, wherein the inner layer is constituted by Zn or a Zn alloy.

5. The wire harness according to claim 1, the wire harness being configured to be used outside an interior space of a vehicle.

6. The wire harness according to claim 1, wherein the inner layer has a thickness of 1 μm or less.

7. The wire harness according to claim 1, wherein an outer diameter of the strand main body portion is set to 0.260 mm to 0.420 mm inclusive.

* * * * *